J. REAL.
PLANTER AND MANURE-DISTRIBUTER.
No. 194,465. Patented Aug. 21, 1877.
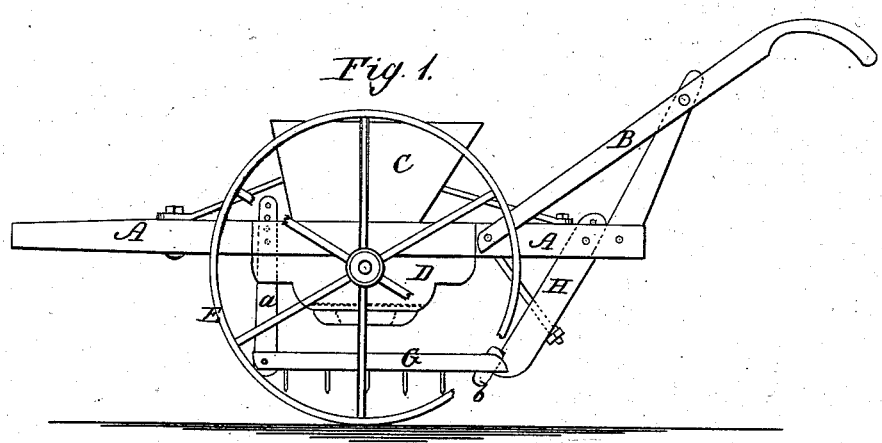
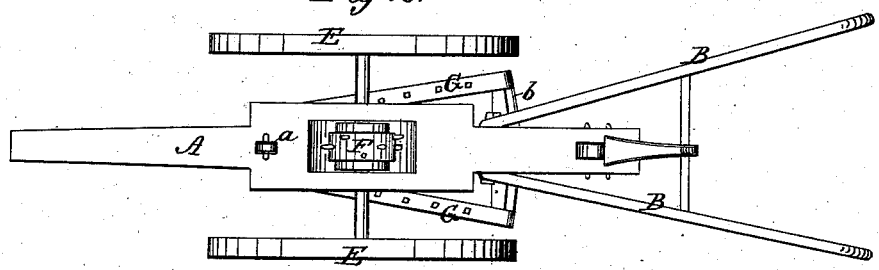
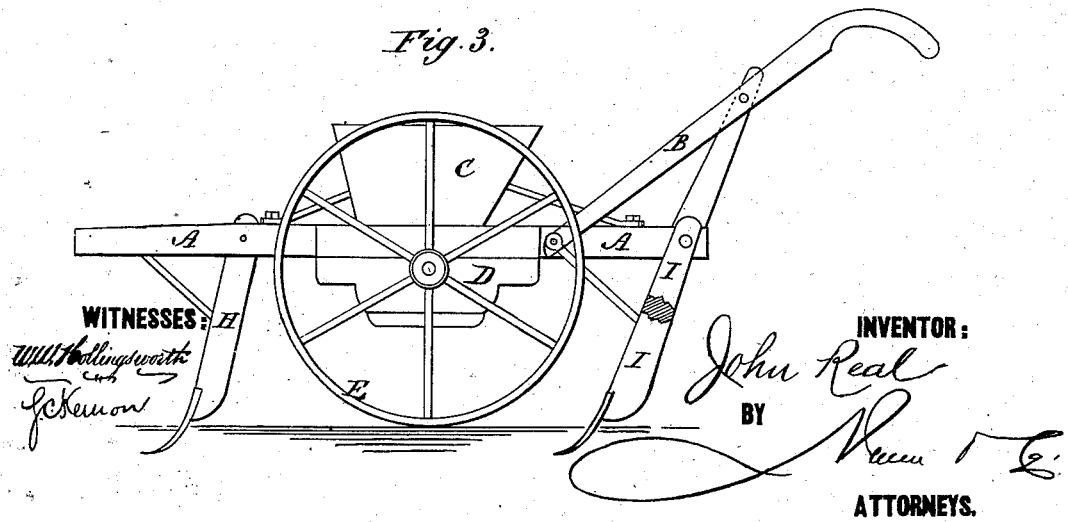

UNITED STATES PATENT OFFICE.

JOHN REAL, OF DOUBLE SPRINGS, MISSISSIPPI.

IMPROVEMENT IN PLANTER AND MANURE-DISTRIBUTER.

Specification forming part of Letters Patent No. 194,465, dated August 21, 1877; application filed June 18, 1877.

*To all whom it may concern:*

Be it known that I, JOHN REAL, of Double Springs, in the county of Oktibbeha and State of Mississippi, have invented a new and Improved Planter and Manure-Distributer; and I do hereby declare that the following is a full, clear, and exact description of the same.

The construction and arrangement of the parts composing my improved machine will be understood upon reference to the accompanying drawing, forming part of this specification, in which—

Figure 1 is a side elevation of the machine, and Fig. 2 a plan view. Fig. 3 is a side view of the machine with the parts arranged for planting corn.

The frame of the machine consists of a beam, A, and handles B, which are connected in the usual manner. A hopper, C, is secured to the enlarged middle portion of the beam, which is mortised, as shown in Fig. 2. The bottom of the hopper is formed of a detachable part, D, in which the axle of the wheels E has its bearings. The function of the wheels is to support the machine and rotate the seed-wheel F which is fixed on the axle and arranged in the center of the bottom portion of the hopper.

As represented in Fig. 1, the machine is adapted for planting cotton-seed or distributing manure. In such case the toothed wheel F is employed to cause the discharge of cotton-seed or manure, as the case may be, through the elongated slot in the bottom of the hopper. The means for covering the cotton-seed consist of a harrow, G, which is arranged beneath the beam A, and is formed of two toothed bars set at an angle to each other, their front ends being attached to a standard, *a*, which is adjustable vertically in a slot in the beam A, while their rear ends are attached to a cross-bar, *b*, that is pivoted to the standard H. Said bar is curved on its under side to adapt it to smooth the soil which the teeth of the harrow throw inward upon the seed as it drops from the hopper. The front end of the harrow is adjusted vertically, by means of the standard *a*, according to the depth at which it is desired to deposit the seed, or as other conditions may require.

When the machine is to be used as a corn-planter the arrangement of parts is as shown in Fig. 3—that is to say, the harrow G is detached, the rear standard H is placed forward of the hopper, and two standards, I I, are attached to the rear end of beam A, and provided with shares or shovels to adapt them to cover the seed deposited in the furrow opened by the share attached to standard H, and a seed-wheel, provided with pockets in place of teeth, is attached to the axle.

What I claim is—

In a planter and manure-distributer, the harrow composed of toothed side bars, the connecting cross-bar *b* secured to the plow-standard H, the vertical standard *a* passing through and made adjustable in a slot in the beam, all said parts being combined as shown and described, for the purpose specified.

JOHN REAL.

Witnesses:
PETER QUINN,
J. O. HENRY.